United States Patent [19]

Frush

[11] Patent Number: 5,038,703
[45] Date of Patent: Aug. 13, 1991

[54] DEVICE AND METHOD TO AID IN TOILET TRAINING PETS

[76] Inventor: Roberta K. Frush, 341 Chestnut Cir., Winthrop Harbor, Ill. 60096

[21] Appl. No.: 396,137

[22] Filed: Aug. 21, 1989

[51] Int. Cl.$^5$ .................. G10K 1/071; A01K 15/00
[52] U.S. Cl. .................. 116/170; 116/148; 119/29
[58] Field of Search .......... 40/331; 116/148, 170; 119/29; 446/419

[56] References Cited

U.S. PATENT DOCUMENTS

| | | | |
|---|---|---|---|
| 2,655,122 | 10/1953 | Adams | 116/148 |
| 3,747,462 | 7/1973 | Mizuno | 116/170 X |
| 3,916,838 | 11/1975 | Swart | 119/29 |
| 4,034,699 | 7/1977 | Reichard | 116/150 |
| 4,400,696 | 8/1983 | Klingensmith | 340/573 |
| 4,414,921 | 11/1983 | Cozzi | 119/29 |
| 4,539,936 | 9/1985 | Majewski | 119/29 |
| 4,686,504 | 8/1987 | German | 340/573 |
| 4,770,114 | 9/1988 | Malone | 116/200 |

*Primary Examiner*—William A. Cuchlinski, Jr.
*Assistant Examiner*—W. Morris Worth

[57] ABSTRACT

A training and communicating device for domestic animals which is mountable to a doorknob or other mounting element on or near a door. An elongated leather strip is provided with an aperture for removably suspending the strip from a doorknob. The strip also has a plurality of pairs of holes for securing through each pair of holes a sleigh bell onto the strip with vinyl lacing. The strip, with bells attached and suspended on or near the door within reach of an animal, produces sound when struck by the animal that may be heard throughout an average-sized home.

4 Claims, 4 Drawing Sheets

5,038,703

DEVICE AND METHOD TO AID IN TOILET TRAINING PETS

FIELD OF INVENTION

This invention provides an owner/trainer with a device and method by which a pet can signal the need to exit or enter a premises. The primary use is as an aid to communication between the pet and owner/trainer relative to the pet's toileting needs. Although it can be used with any pet, it is being marketed as the DOGGIE DOORBELL TM Toilet Training Aid for Pets.

DESCRIPTION OF PRIOR ART

Paper or litter pan training for pets has disadvantages: clean-up is messy, unpleasant odors persist in the home, and newspapers or pots of planting soil not intended for the use of the pet may be mistaken for the proper target.

In the field of dog training, experts such as Barbara Woodhouse have recommended training a dog to go outside to use the toilet. However, current outdoor toilet training practices are frequently inconvenient, costly, and involve specific disadvantages:

1. Many owner/trainers must rely on taking a pet out at regular intervals for toileting. Frequent outdoor visits are usually an inconvenience to the owner/trainer, but are necessary because the pet may have a toileting accident if the opportunity to go out comes too late.

2. Pet trapdoors permit a pet to leave or enter a premises at will and are available for use in homes and kennels. However, trapdoors require skilled installation and leave a permanent opening in a door or wall. Pet trapdoors can not be used with animals who must be accompanied out of doors, taken to a pet run, or fastened to a lead.

The most efficient toilet training practices for pets involve some type of communication from the pet indicating the need to go out, thus eliminating unnecessary trips. Several patterns of communication have been utilized to date, but all present certain disadvantages:

1. The pet barks, meows, etc. when it needs to go outside. This may lead to confusion because such "verbal" communication is frequently used to indicate other topics of conversation, as well; such communication is not specific to the need to go outside.

2. The pet is observed by the owner/trainer to approach the outside door or pace back and forth, etc. These and other behavioral indicators communicate the pet's need to go outside only if the owner/trainer is present in the room and able to visually observe the pet's behavior. Occasionally, the trainer may be in another room—one which is "off limits" to the pet because of house rules or a closed door. Some pet owners may have impaired sight which makes it difficult to visually observe the pet's behavior. The fact that the pet's need to go outside has gone unheeded is evidenced by the frequency of "accidents" occurring near the door(s) used during the training.

At times it is beneficial to know when a pet wishes to enter the premises. For example, if a person is working or relaxing outside and has been accompanied by a pet, the animal may wish to go indoors for a drink of water or a nap but may have difficulty communicating this desire to the master.

A search of the prior art revealed that there are devices which allow a pet to ring a bell to communicate a need to a person. However, they are not designed specifically for use in communicating pet toileting needs. Training is difficult with some of these devices because the pet must learn a very specific behavior, such as jiggling a spring plate to cause a bell to ring or pulling a ring which is attached to the spring plate. Some of these earlier devices require skilled installation with specific hardware, leave permanent marks as the result of the installation, and these devices are not portable. One of the previous devices (Reichard) does not require skilled installation with specific hardware, but sets on the floor near the door where it might interfere with the normal traffic pattern and requires that the dog push down on an activator pad to ring a bell. The DOGGIE DOORBELL TM Toilet Training Aid for Pets hangs from the doorknob, out of the way of the traffic pattern, and requires a less specific action on the part of the pet because the pet may also ring it by nudging it with the nose or brushing past it as the pet walks by the door. The DOGGIE DOORBELL TM Toilet Training Aid for Pets incorporates a natural action of most dogs, who associate the doorknob with the opening of the door, as evidenced by the vast number of dogs who nudge the doorknob in an attempt to open the door or who scratch below the doorknob to indicate the need to go out. Either action will ring the DOGGIE DOORBELL TM Toilet Training Aid for Pets.

OBJECTS AND ADVANTAGES

The object of the invention is to provide a device and a method by which a pet can signal the need to exit or enter a premises. The device offers several advantages.

1. A pet can be trained to make physical contact with the device so as to cause it to produce an auditory signal, for example, the jingling of bells, which communicates the pet's wish to exit or enter a premises.

2. The device, when properly stimulated by the pet, produces sound that can be heard throughout an average-sized home.

3. The device hangs from a doorknob, latch, window fastener, or other existing hardware, therefore requiring no difficult installation, additional hardware, or tools.

4. The device leaves no permanent installation marks and, during normal use, will not mark the door, gate, wall, etc.

5. The device is portable and may be used at various cites, both inside and outside a door or gate.

6. The device is designed so that it will not fall from the door during normal use.

7. The device can be decorative as well as functional, and the shape can suggest the function. For example, when the device is designed and marketed specifically for dogs, the DOGGIE DOORBELL TM Toilet Training Aid for Pets is formed in the shape of a fireplug or tree, because trees and fireplugs are outdoor objects and are favored by male dogs as toileting sites.

8. In comparison with the spring plate or pull ring invention described in prior art, this device requires a much less specific action by the pet. For example, any physical contact by the pet with any portion of the device will cause it to sound. Therefore, a pet is successful in causing the device to sound when brushing against it with any part of the body, even the tail.

9. The device does not set on the floor, and therefore does not interfere with the traffic pattern near the door.

10. The device utilizes the natural actions of dogs, who frequently nudge a doorknob or scratch at the door when needing to go outside.

DRAWING FIGURES

Figure 1:
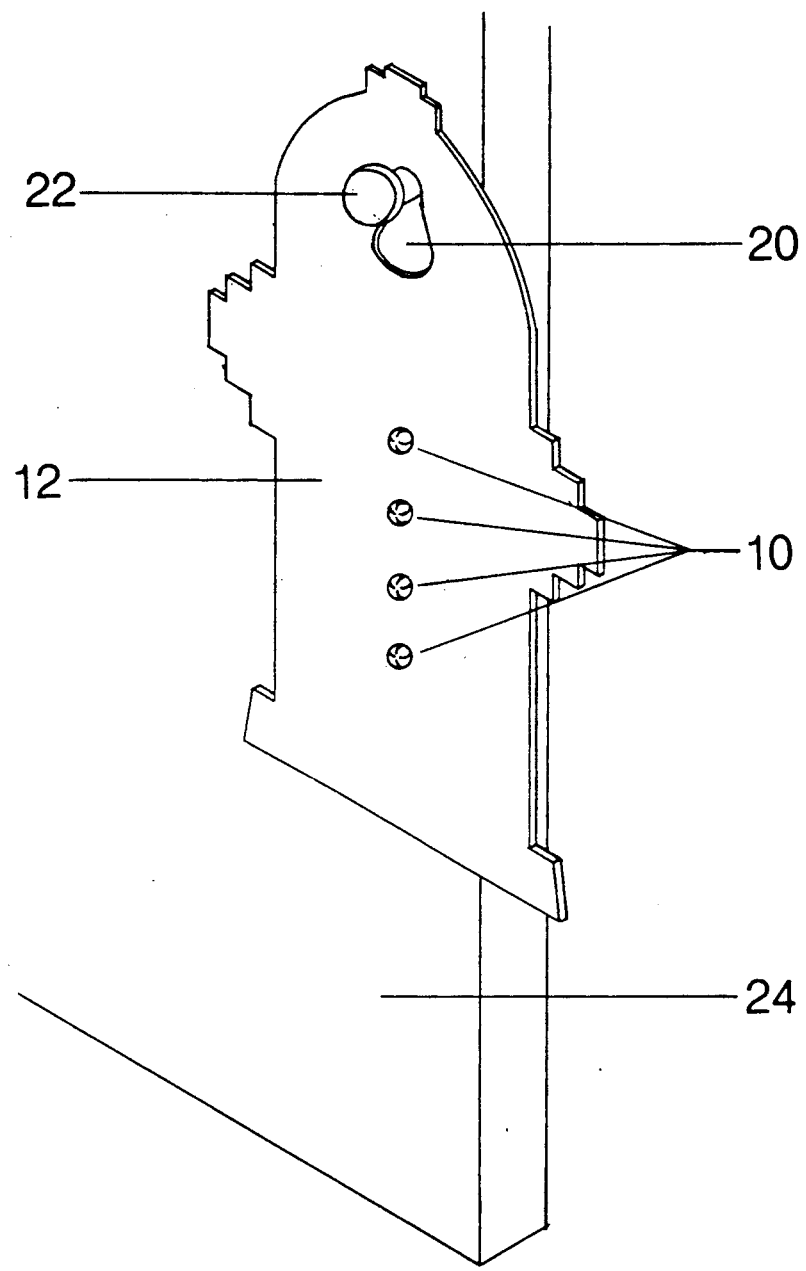
FIG. 1 is a front view of the device of the present invention in place on a door, as it hangs from a doorknob, with parts of the door broken away.

DRAWING REFERENCE NUMERALS 10 sounding objects
12 backing
14 means of fastening
16 holes
18 lacing
20 pear-shaped hole
22 doorknob
24 door

DESCRIPTION OF THE INVENTION

Various shapes and materials could be used to make the present invention. The drawings and descriptions show two of the preferred embodiments of the invention.

Figure 2:
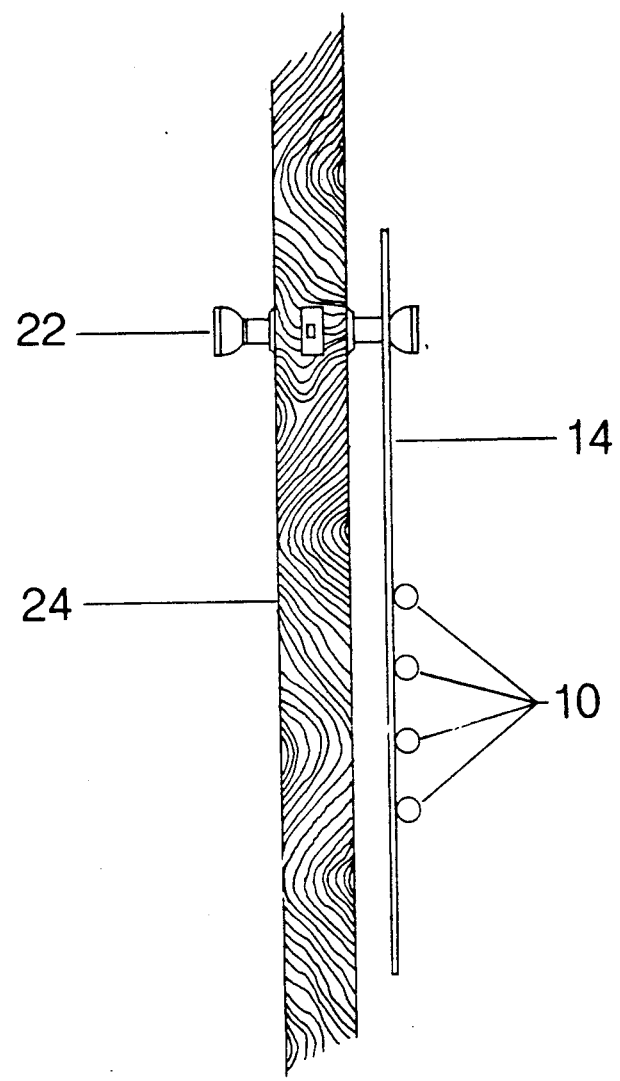
FIG. 2 is a cross-sectional view of the device of the present invention as it hangs from a doorknob, with parts of the door broken away.

The device comprises four sounding objects 10, which are shown in FIGS. 1 and 2 as 1½ inch sleigh bells, affixed to a plane surface backing 12. Backing 12 comprises an approximately ¼ inch thick elongated strip of leather, die cut in the shape of a fireplug. A pear-shaped hole 20 is centered horizontally about 1 inch down from the upper edge of the backing 12 and is approximately 2 inches in diameter in it's larger circular section and 1 inch wide and 1½ inches long in it's smaller section. The pear-shaped hole 20 enables the backing 12 to be removably suspended from a doorknob 22.

Figure 3:
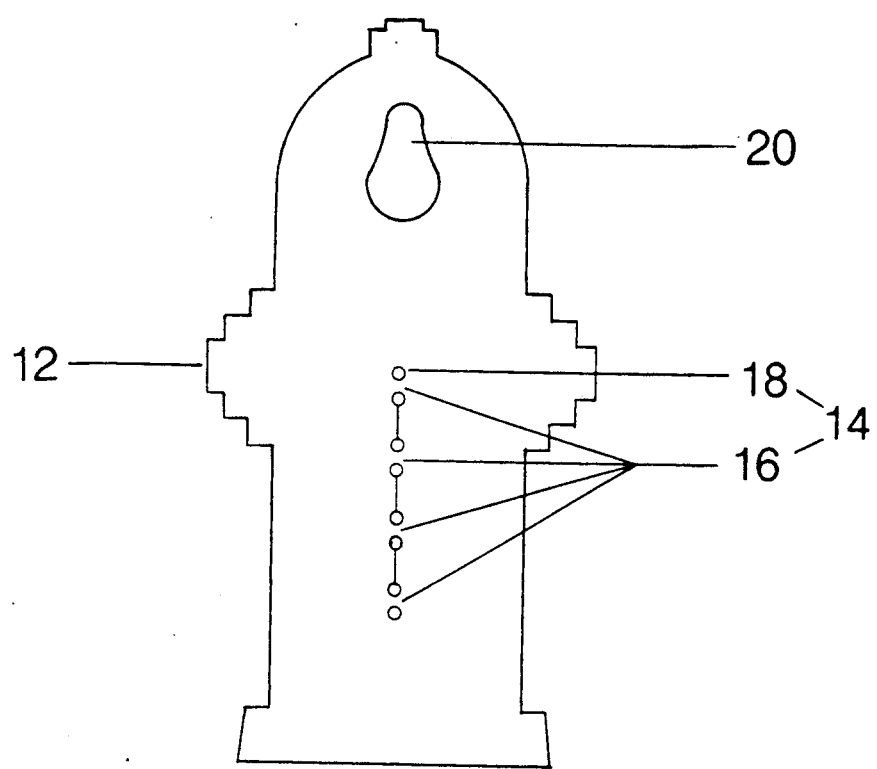
FIG. 3 is a rear view of the device of the present invention showing a suggested means of fastening the sounding objects to the backing.

Although the bells are not visible, a means of fastening 14 the bells to the backing 12 can be seen in FIG. 3. The means of fastening 14 comprises eight circular ¼ inch holes 16 arranged in four pairs extending vertically down the center of the lower portion of the backing 12 and an 8 inch strip of vinyl lacing 18. Leaving a 1 inch knotted tail in the lacing 18 and beginning with the top pair of holes 16, the lacing 18 is inserted from back to front through the upper hole 16 of each pair, through a hook in the back of a bell, and through the lower of each pair of holes 16 in the backing 12. Using the same lace without tying another knot, the lacing process is repeated until four bells are laced to the backing 12. The lacing 18 is knotted close to the backing 12, and a 1 inch tail is left.

Figure 4:
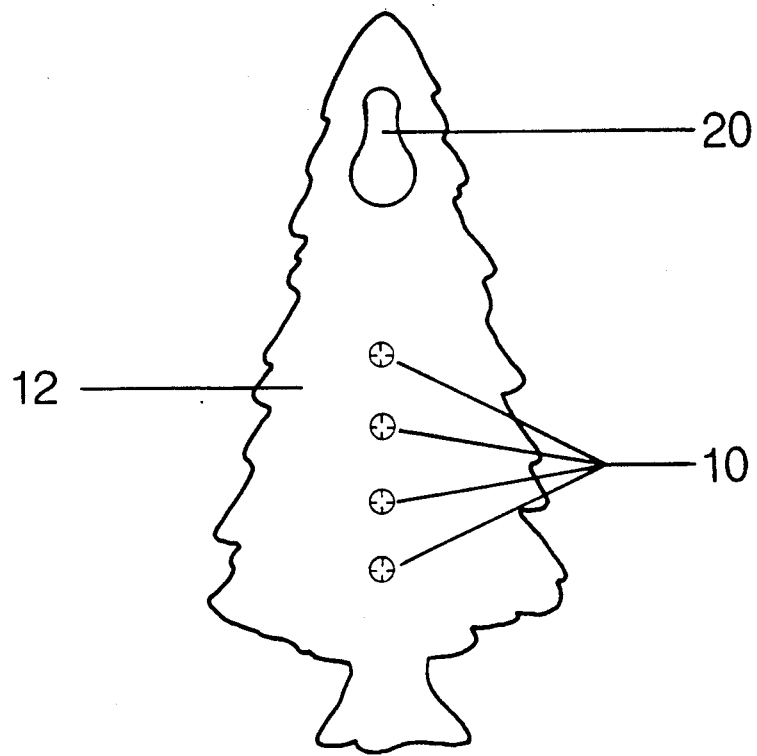
FIG. 4 is a front view of the device of the present invention with a backing of an alternate shape.

An alternate preferred embodiment of the present invention is shown in FIG. 4: the backing 12 is in the shape of a tree.

OPERATION OF THE INVENTION

The use of the present invention and method of training require little time, no prior training of the animal, and no particular expertise on the part of the owner/trainer. The method incorporates principles of operant learning and conditioning.

1. The owner/trainer should choose one specific door, window, gate, etc. by which the pet will exit and enter the premises for toileting and exercise. A centrally located door will enable the sound of the device to be heard throughout an average-sized home. (In the preferred embodiment of the device, sleigh bells ring.)

2. The device should be removably suspended from existing hardware, such as a doorknob or latch, in close proximity to the exit. With hardware smaller than a doorknob, a common rubber band can be repeatedly wrapped around the hardware, after the device is in place, to prevent the device from slipping off.

3. Immediately prior to exiting or entering the premises with the pet, the owner/trainer should lead the pet to the device and state, "Outside!" or "In!", while assisting the pet to strike and sound the device with any part of it's body. This can be easily accomplished by assisting the pet to sit, lifting a front paw, and brushing the paw against the device. Although the paw is used for training purposes, most dogs prefer to nudge the device with the nose or brush it with the body as they walk by the device.

4. As the device sounds, the owner/trainer should offer lavish verbal praise such as, "What a good (boy/girl)! (Name of pet) is a good (boy/girl/puppy/etc.)!" and lead the pet out or in.

With repetition of the above sequence, the pet will associate the sounding of the device with the power to obtain the opportunity to exit or enter the premises as the need or desire arises.

If the pet begins to sound the device too frequently, for example, every fifteen minutes, the following procedure should be followed: The owner/trainer should gradually stretch the interval between soundings of the device by ten-minute increments. In order to accomplish this, the device should be removed immediately after the pet returns from toileting. Ten minutes should be added to the interval last used by the pet, and then the device should be replaced. The time that the device is unavailable to the pet should be gradually increased. If a toileting accident occurs, the pet should be scolded and taken out to complete the toileting. However, the device should be made available ten minutes sooner the next time.

I claim:

1. A training and communication device for domestic animals comprising:

support means comprising an elongated strip of flexible material with aperture means at one end thereof for permitting said support means to be removably suspended in proximity of a dwelling entrance/exit having a door from a supporting element on or nearby said door at a height reachable by a domestic animal;

sounding means for emitting an audible sound when said support means is struck by said animal so as to attract the attention of humans in the dwelling to communicate the animal's desire to have access through the door; and fastening means for securing said sounding means to said support means.

2. The device of claim 1, wherein said support means is made of leather.

3. The device of claim 2, wherein said sounding means comprises sleigh bells.

4. The device of claim 3, wherein said fastening means comprises a strip of vinyl lacing and a pair of holes in said support means for each bell through which said bells are secured by said lacing to said support means.

* * * * *